Aug. 29, 1967     H. BARTELS     3,338,619
WALL UPHOLSTERING OF STORAGE SPACES OF
CARGO-CARRYING MOTOR VEHICLES
Filed July 20, 1965
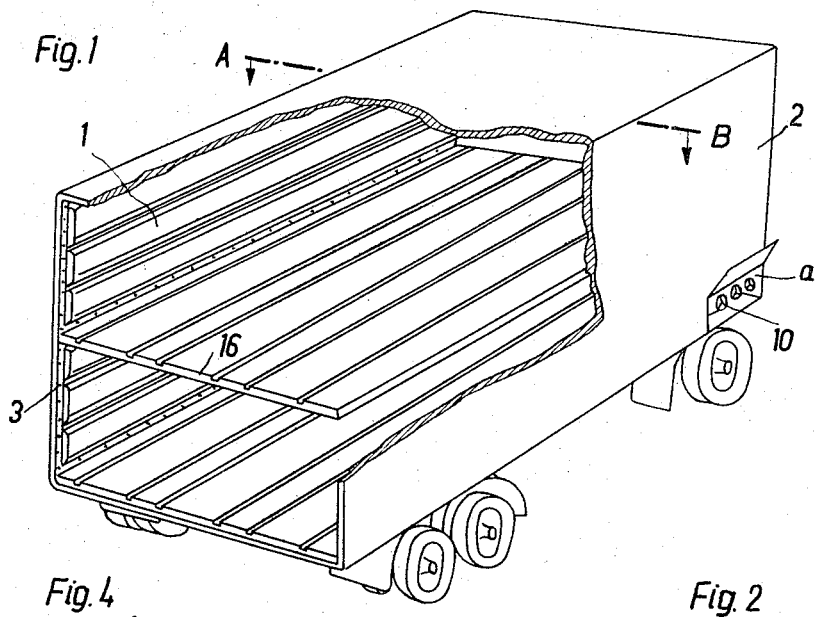
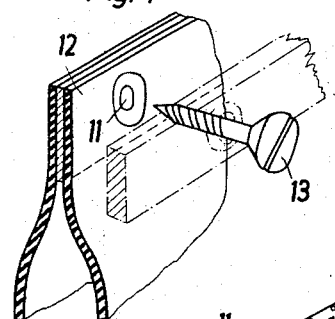
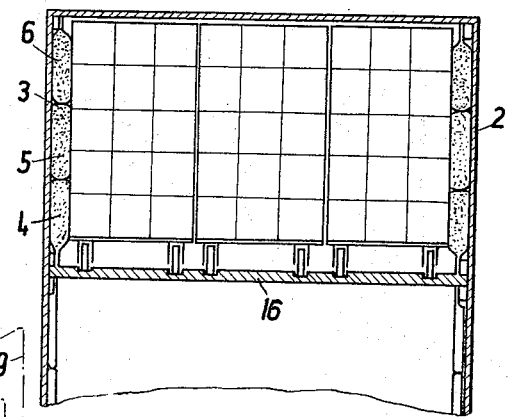
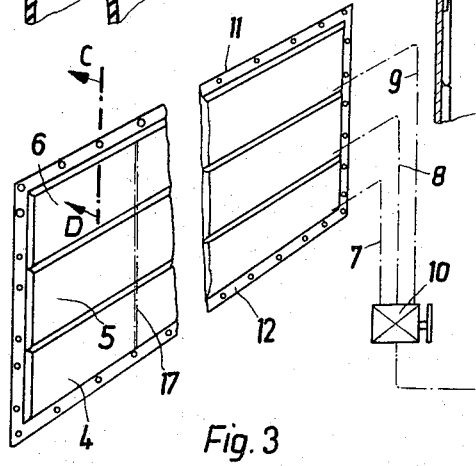
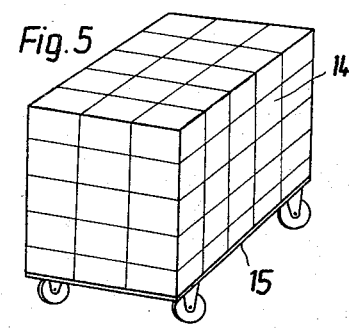

3,338,619
WALL UPHOLSTERING OF STORAGE SPACES
OF CARGO-CARRYING MOTOR VEHICLES
Helmut Bartels, Hannover, Germany, assignor to
Werner Bahlsen, Hannover, Germany
Filed July 20, 1965, Ser. No. 473,292
Claims priority, application Germany, July 23, 1964,
B 77,810
1 Claim. (Cl. 296—24)

This invention relates to freight vehicles and in particular to upholstery for the walls of the storage spaces of such vehicles.

It is known to pad with soft materials the walls of storage spaces for the protection of articles being transported, especially in furniture vans. When transporting furniture it is also known to insert air cushions between the individual pieces, the air cushions being blown up sufficiently hard to protect the individual pieces from one another or from the sides of the van.

According to the present invention there is provided upholstery for the walls of storage spaces in freight vehicles comprising inflatable air cushions fixed to the walls of the vehicle, the cushions being connected to a source of compressed air through shut-off valves.

According to a feature of the invention that side of each air cushion adjacent the storage space comprises prestressed elastic walls.

After loading the van the air cushions are blown up so that they lie against the load and before unloading they are deflated.

The air cushions may be deflated simply by connecting them with the atmosphere and driving the air out of them by means of the prestressing of their elastic walls. Alternatively they may also be deflated through discharge blowers which blowers pump the cushions empty and are connected to the air cushions in such a way that they can be shut off.

Preferably substantially the whole wall surface of the storage space is provided with the air cushions. It is however, possible to provide air cushions separated from one another in zones, which zones can be filled and emptied independently of any other zone. In this way a supporting force can be provided which is stronger or weaker in different zones of the load as required. It is also possible to restrict the inflation to an individual zone or zones of the walls if the storage space is only partly filled.

An embodiment of the invention will be described, by way of example, with reference to the accompanying drawings in which:

FIGURE 1 shows in part section a freight vehicle trailer and the storage space therein, FIGURE 2 is a cross-section through such a storage space, FIGURE 3 is an upholstery element with three cushion zones, FIGURE 4 shows a detail of the fixing of the wall cushions, and FIGURE 5 is an example of a pallet with goods conveyed thereon which is particularly suitable for transportation in such a storage space.

The storage space of the vehicle shown in FIGURE 1 is divided up by a central partition floor 16 into an upper and a lower space. The floor and the central partition floor of the storage space have guides for pallets 15 of the type shown in FIGURE 5, such guides being in the form of laterally spaced sets of guide grooves for receiving the wheels of the side by side disposed loaded pallets (shown in FIGURE 2). The pneumatic upholstery 1, FIGURE 1, is applied in such a way that the two side surfaces 2, 3 of the trailer are completely covered by the upholstery. Here for instance the pneumatic upholstery which may consist for example of rubber cushions is subdivided over the height of the side wall into three strips 4, 5 and 6 extending going right across, see FIGURES 2 and 3. Air is here fed to these strips through three airpipes 7, 8 and 9, FIGURE 3, which are led to the air valves 10 provided at the front of the vehicle at a.

Bores 11 are provided in edge fillets 12 of the upholstery in FIGURES 3 and 4 for fixing purposes, so that a simple fixing is possible by means, for instance, of woodscrews 13 as in FIGURE 4. The trailer is designed for the transport of cubic packages 14 (FIGURE 5) which are moved into the vehicle on a roller pallet 15 in three adjacent stacks of five superimposed articles.

The upholstery surface can of course also be subdivided in the longitudinal direction by partition seams 17, FIGURE 3. In this case an air feed could be provided for each upholstery zone. Before removing the pallets air is sucked out of the upholstery cushions through the valves 10.

Wall upholstery constructed as described above has been found to be advantageous over known constructions in that it is fixed and no more interferes with the use of the storage space than known types of padding. It offers the widest possible possibilities of adaptation. It is particularly suitable for the conveyance of goods in packaged units, which is generally done in freight trailers. The packages are supported by these cushions softly, but without any considerable play and damage during transport does not occur.

I claim:

In a vehicle for the transportation of pallets having only panel-like bases with wheels on their undersides and loaded on their upper sides with individual, separate and non-united packages, said vehicle having opposing spaced apart, rigid vertical side walls and a horizontally disposed rigid main flooring disposed transversely between the side walls; the improvement whereby said pallets are held in said vehicle in end to end and side by side vertically multiple relationship without substantial play between the piles of packages borne by them, said improvement comprising the provision of at least one horizontal partition flooring disposed between the side walls above and parallel with the main flooring, said floorings being provided with laterally spaced sets of guide grooves extending parallel with the side walls for receiving the wheels and retaining the loaded pallets closely alongside themselves on both floorings against lateral movement relative to each other and to the side walls, inflatable vertically spaced strip-like air cushions provided on the interiors of the side walls and extending longitudinally of the side walls above the floorings to bear against the packages on the pallets when inflated, said cushions having prestressed elastic walls engageable with the packages, and means for selectively inflating the cushions so as to bear against the vertically arranged packages on the pallets dependent upon the height arrangement of the packages during movement of the vehicle and for deflating the cushions during loading and unloading of the package carrying pallets.

References Cited

UNITED STATES PATENTS

| 2,819,810 | 1/1958 | De Witt | 105—369 |
| 3,067,699 | 12/1962 | Fredricks | 105—369 |
| 3,098,562 | 7/1963 | Simmons | 105—369 |

BENJAMIN HERSH, *Primary Examiner.*

P. GOODMAN, *Examiner.*